US012616260B2

(12) United States Patent    (10) Patent No.:   US 12,616,260 B2

Colatruglio            (45) Date of Patent:      May 5, 2026

(54) FLAME RESISTANT MATERIAL FOR A PROTECTIVE GARMENT

(71) Applicant: Fire-Dex, LLC, Medina, OH (US)

(72) Inventor: Matthew L. Colatruglio, Medina, OH (US)

(73) Assignee: FIRE-DEX, LLC, Medina, OH (US)

( * ) Notice: Subject to any disclaimer, the term of this patent is extended or adjusted under 35 U.S.C. 154(b) by 346 days.

(21) Appl. No.: 17/935,904

(22) Filed: Sep. 27, 2022

(65) Prior Publication Data

US 2023/0101365 A1      Mar. 30, 2023

Related U.S. Application Data

(60) Provisional application No. 63/248,805, filed on Sep. 27, 2021.

(51) Int. Cl.

| | |
|---|---|
| *A41D 31/06* | (2019.01) |
| *B32B 5/02* | (2006.01) |
| *B32B 5/26* | (2006.01) |
| *B32B 27/12* | (2006.01) |
| *B32B 27/32* | (2006.01) |
| *B32B 27/40* | (2006.01) |

(52) U.S. Cl.

CPC ............ *A41D 31/065* (2019.02); *B32B 5/024* (2013.01); *B32B 5/026* (2013.01); *B32B 5/26* (2013.01); *B32B 5/262* (2021.05); *B32B 27/12* (2013.01); *B32B 27/322* (2013.01); *B32B 27/40* (2013.01); *B32B 2250/20* (2013.01); *B32B 2262/0246* (2013.01); *B32B 2262/0269* (2013.01); *B32B 2262/14* (2013.01); *B32B 2307/304* (2013.01); *B32B 2307/3065*

(2013.01); *B32B 2307/7246* (2013.01); *B32B 2437/00* (2013.01); *B32B 2571/00* (2013.01)

(58) Field of Classification Search

CPC ...... A41D 31/065; B32B 5/024; B32B 5/026; B32B 5/26; B32B 5/262; B32B 27/12; B32B 27/322; B32B 27/40; B32B 2250/20; B32B 2262/0246; B32B 2262/0269; B32B 2262/14; B32B 2307/304; B32B 2307/3065; B32B 2307/7246; B32B 2437/00; B32B 2571/00; B32B 2262/02; B32B 2307/7265

USPC .................. 442/182, 301, 302; 428/920, 921

See application file for complete search history.

(56) References Cited

U.S. PATENT DOCUMENTS

| | | | | |
|---|---|---|---|---|
| 10,612,166 B1 * | 4/2020 | Ball | .......................... | D04H 1/43 |
| 2008/0113175 A1 * | 5/2008 | Ke | ........................... | B32B 5/02 |
| | | | | 428/221 |

(Continued)

*Primary Examiner* — Matthew D Matzek

(74) *Attorney, Agent, or Firm* — Michael E. Dockins; Shumaker, Loop & Kendrick, LLP

(57)           ABSTRACT

Oxidized polyacrylonitrile fiber (OPF) containing fabrics when used in the fire service, either in a NFPA 1971 or NFPA 1951 compliant protective garments, offer exceptional comfort and protection characteristics that ensure firefighters can safely perform their duties in structural fire, overhaul, urban search and rescue, and other various missions. OPF containing fabrics used in turnout gear outer shells and compliant with NFPA 1971, provide the best combination of protection as tested by the thermal protective performance test and comfort as tested by the total heat loss/resistance to evaporative heat transfer test.

17 Claims, 3 Drawing Sheets

(56)                    References Cited

U.S. PATENT DOCUMENTS

2021/0086004 A1*    3/2021   Guo ........................ B32B 5/026
2021/0114332 A1*    4/2021   Hessenberger ......... B32B 5/245

* cited by examiner

FLAME RESISTANT MATERIAL FOR A PROTECTIVE GARMENT

CROSS-REFERENCE TO RELATED APPLICATION

This application claims the benefit of U.S. Provisional Patent Application Ser. No. 63/248,805, filed Sep. 27, 2021, the entirety of which is herein incorporated by reference.

FIELD

The invention relates generally to a flame resistant material, and more particularly, to a flame resistant material containing oxidized polyacrylonitrile fiber (OPF) to improve comfort and protection of protective garments.

BACKGROUND

Conventional protective garments are designed to shield a wearer from a variety of environmental hazards, and firefighting turnout gear is representative of such garments. The firefighting turnout gear includes coats, pants, coveralls, helmets, gloves, footwear, and interface components. Typically, the turnout gear comprises an outer shell, a moisture barrier located beneath the outer shell, and a thermal liner located beneath the moisture barrier.

The outer shell typically is constructed of an abrasion-, flame- and heat-resistant material such as a woven aramid material, typically Nomex® or Kevlar® (all are trademarks of E. I. DuPont de Nemours & Co., Inc.) or a polybenzamidazole, a polybenzoxazole, or an oxidized polyacrylonitrile (OPAN) material. The moisture barrier typically includes a semipermeable membrane layer which is moisture vapor permeable but impermeable to liquid moisture, such as CrossTech® (a trademark of W. L. Gore & Associates, Inc.) or Stedair® 4000 (a trademark of Stedfast Inc.). The membrane layer is bonded to a substrate of flame- and heat-resistant material, such as an aramid or PBI® material. Further, the thermal liner typically is constructed of a nonwoven fabric, usually spunlace, quilted to a facecloth.

One of the most dangerous threats to wearers of protective garments is heat exhaustion, which could possibly result in death. The primary mechanism of a human body to prevent heat exhaustion and normalize core body temperature is to sweat (i.e. emit liquid moisture). Once the sweat on the skin evaporates into moisture vapor, it is able to carry heat away from the body. During active firefighting, for example, the wearer produces immense amounts of liquid moisture and heat that must be transferred from the body in order to cool the wearer and prevent an overheated state. If the wearer experiences an overheated state and remains therein, the wearer may succumb to heat exhaustion, which is the number one killer of firefighters today.

It is paramount that the protective garments provide adequate protection. Requirements for protective garments that are employed as firefighting turnout gear must meet a Thermal Protective Performance (TPP) of 35 as defined in the National Fire Protection Association (NFPA) 1971, a Total Heat Loss (THL) of greater than 205 W/m$^2$, and a relatively low Resistance to Evaporative Heat Transfer (Ret). Typically, improving TPP in protective garments results in increased fabric weight at a detriment of comfort and THL. Thus, there exists a need for an improved flame resistant material for protective garments, especially firefighting turnout gear, as measured by the Thermal Protective Performance test. The material also needs to achieve a desired comfort level and a lower core body temperature by efficiently moving heat via conduction and evaporative heat transfer. Both dry and wet (perspiration) heat transfer are measured by Total Heat Loss (THL) and Resistance to Evaporative Heat Transfer (Ret).

Accordingly, it would be desirable to develop a flame resistant material that improves comfort and protection of protective garments.

SUMMARY

In concordance and agreement with the presently described subject matter, a flame resistant material that improves comfort and protection of protective garments, has surprisingly been developed.

In one embodiment, a material, comprises: a plurality of first fibers produced from an oxidized polyacrylonitrile, wherein at least one of the first fibers is a stretch broken fiber; and a plurality of second fibers combined with the first fibers, wherein the second fibers are produced from at least one of an oxidized polyacrylonitrile, a flame resistant fiber and a non-flame resistant fiber.

As aspects of some embodiments, at least one of the second fibers is an aramid fiber.

As aspects of some embodiments, the material further comprises a plurality of third fibers blended with the first fibers and the second fibers.

As aspects of some embodiments, at least one of the second fibers is a meta-aramid and at least one of the third fibers is a para-aramid.

As aspects of some embodiments, the material comprises about 18% of the first fibers, about 22% of the second fibers, and about 60% of the third fibers.

As aspects of some embodiments, at least one of the second fiber is a stretch broken fiber.

As aspects of some embodiments, the material comprises about 5% to about 30% of the first fibers.

In another embodiments, a protective garment, comprises: an outer shell; and a thermal liner disposed adjacent the outer shell, wherein at least a portion of the protective garment is formed from a material comprising at least one first fiber produced from an oxidized polyacrylonitrile.

As aspects of some embodiments, at least a portion of the outer shell is formed from the material comprising the at least one first fiber produced from an oxidized polyacrylonitrile.

As aspects of some embodiments, at least a portion of the thermal liner is formed from the material comprising the at least one first fiber produced from an oxidized polyacrylonitrile.

As aspects of some embodiments, the thermal liner includes at least one of a facecloth layer and an insulation layer, and wherein at least a portion of the at least one of the facecloth layer and the insulation layer is formed from the material comprising the at least one first fiber produced from an oxidized polyacrylonitrile.

As aspects of some embodiments, the protective garment further comprises a moisture barrier disposed between the outer shell and the thermal liner.

As aspects of some embodiments, at least a portion of the moisture barrier is formed from the material comprising the at least one first fiber produced from an oxidized polyacrylonitrile.

As aspects of some embodiments, the moisture barrier comprises a substrate and a membrane disposed on the substrate.

As aspects of some embodiments, at least a portion of the substrate of the moisture barrier is formed from the material comprising the at least one first fiber produced from an oxidized polyacrylonitrile.

As aspects of some embodiments, the membrane is produced from at least one of a polytetrafluoroethylene (PTFE), an expanded polytetrafluoroethylene (ePTFE), a polyurethane (PU), and a urethane.

In yet another embodiment, a laminate, comprises: a first layer, wherein at least a portion of the first layer is formed from a material comprising at least one first fiber produced from an oxidized polyacrylonitrile; and a second layer disposed adjacent the first layer, wherein the laminate forms at least a portion of a particulate blocking material.

As aspects of some embodiments, the second layer is a particulate blocking film.

As aspects of some embodiments, the laminate further comprises a third layer disposed adjacent the second layer.

As aspects of some embodiments, the third layer is at least one of a knit, a woven, and a stretch woven.

BRIEF DESCRIPTION OF THE DRAWINGS

The above, as well as other advantages of the present disclosure, will become readily apparent to those skilled in the art from the following detailed description of a preferred embodiment when considered in the light of the accompanying drawings.

DETAILED DESCRIPTION

Figures 1, 2:
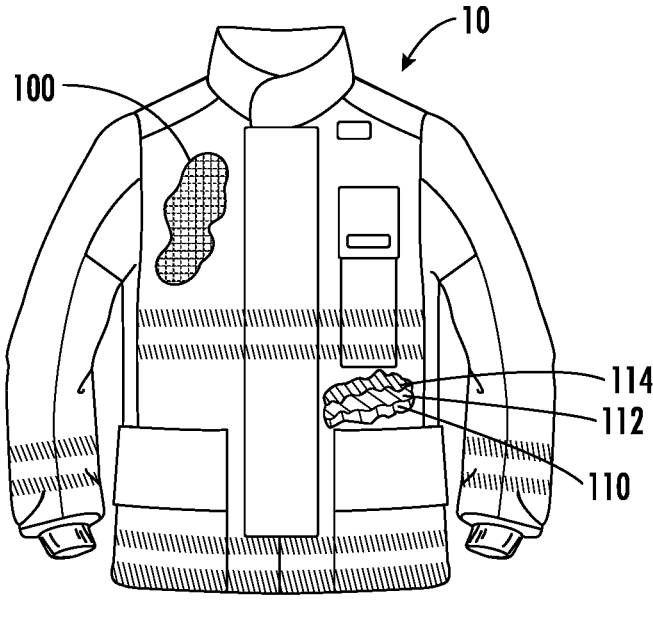
FIG. 1 is a front elevational view of a protective garment comprising an outer shell, a moisture layer, and a thermal liner according to an embodiment of the present disclosure, wherein the protective garment is a turnout coat having at least a portion produced from a flame resistant material comprising at least an oxidized polyacrylonitrile fiber (OPF)
FIG. 2 is a rear elevational view of the protective garment of FIG. 1.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The presently described subject matter relates to a flame resistant material comprising at least an oxidized polyacrylonitrile fiber (OPF) for use in protective garments.

Figure 3:
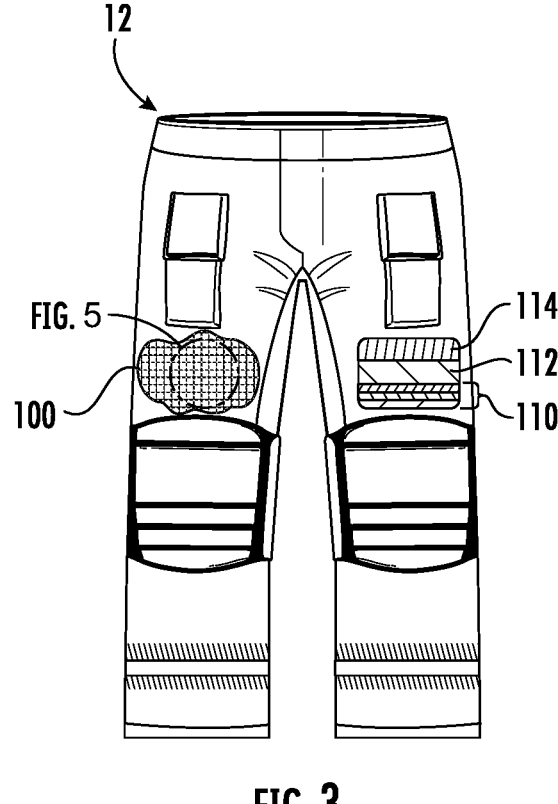
FIG. 3 is a front elevational view of a protective garment accordingly to another embodiment of the present disclosure, wherein the protective garment is a turnout pant having at least a portion produced from a flame resistant material comprising at least an oxidized polyacrylonitrile fiber (OPF)

FIGS. 1-3 illustrate exemplary protective garments 10, 12 using a flame resistant material 100 according to the present disclosure. As discussed herein, the protective garments 10, 12 may be firefighting turnout gear. Firefighting turnout gear must comply with the NFPA 1971 standards requiring a composite thermal protection performance (TPP) of >35 and a total heat loss (THL)>205. In the next standards of NFPA 1971, the Resistance to Evaporation of a Textile (Ret) test (ISO 11092) will become a requirement. The Ret test is a means to evaluate a resistance of a material or material set to evaporative heat transfer. Ret is conducted per ISO 11092, 1993 edition, and is expressed in $m^2$ Pa/W. Higher Ret values indicate lower moisture vapor permeability and higher resistance to evaporative heat transfer, and thus, more heat trapped within the protective garments 10, 12 and subjected to the wearer. One such Ret test measures the resistance to evaporative heat transfer through a three-layer composite using a sweating guarded hot plate at 35 degrees Celsius and 40% relative humidity.

Low Ret is particularly beneficial in the protective garments 10, 12 that experience high amounts of heat and moisture. This is because relatively low Ret indicates that the protective garments 10, 12 efficiently move moisture vapor and heat; thus cooling down the firefighter and avoiding heat exhaustion. Improving the Ret of the protective garments 10, 12 will keep the wearer much cooler versus conventional garments that have a higher Ret, which increases a risk of heat exhaustion of the wearer.

Particularly, FIGS. 1 and 2 illustrate a firefighting turnout coat representative of the protective garment 10 and FIG. 3 illustrates a firefighting turnout pant representative of the protective garment 12, both of which can be donned by firefighter personnel when exposed to flames and extreme heat. It is noted that, although a firefighting turnout coat and pant are shown in FIGS. 1-3 and described herein, the present disclosure pertains to protective garments 10, 12 generally. Accordingly, the identification of firefighting turnout gear is not intended to limit the scope of the disclosure. The protective garments 10, 12 may be other types of protective garments which include, but are not limited to, suits for industrial workers (including, for example, arc flash apparel), wildland's firefighters, race car drivers, airplane pilots, military personnel, and the like.

Figure 4:
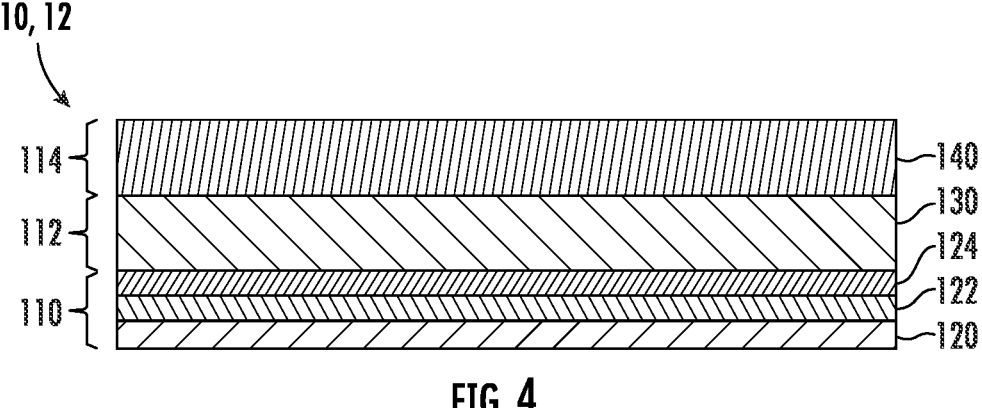
FIG. 4 is fragmentary cross-sectional view of a portion of the protective garment of FIGS. 1-3.

As depicted in FIG. 4, the protective garments 10, 12 each may comprises a thermal liner 110 that forms an interior surface (i.e., a surface that contacts the wearer) of the protective garments 10, 12; a moisture barrier 112 that forms an intermediate layer of the protective garments 10, 12; and an outer shell 114 that forms an exterior surface of the protective garments 10, 12.

The thermal liner 110 shown may, optionally, include a facecloth layer 120, a first insulation layer 122, and a second insulation layer 124, which may be quilted together. In alternative embodiments, however, the thermal liner 110 may only include one of the insulation layers 122, 124 used with or without the facecloth layer 120. When it is used, the facecloth layer 120 may be constructed of at least one material comprising flame resistant and/or moisture-wicking fibers or filaments made of, for example, at least one of an aramid (meta-aramid or para-aramid), polybenzimidazole, polybenzoxazole, melamine, cellulosics, flame resistant (FR) cellulosics, modacrylic, carbon, or the like, and blends thereof. In one embodiment, the facecloth layer 120 may be produced from at least one of a spunlace, a woven material, a nonwoven material, a stretch woven material, a knit material, a fleece material, and a laminate material, for example. The facecloth layer 120 may be, optionally, finished with a hydrophilic finish that draws perspiration off of the wearer, if desired.

Each of the insulation layer 122, 124 may comprise a material that includes one or more flame resistant fibers. The insulation layers 122, 124 may each comprise a single layer of nonwoven material, or two layers of nonwoven material, or multiple layers of nonwoven material. In one embodiment, at least one of the insulation layers 122, 124 may be produced from at least one of a spunlace, a woven material, a nonwoven material, a stretch woven material, a knit material, a fleece material, and a laminate material, for example. In other embodiments, the first insulation layer 122 may be produced from a blend of meta-aramid (e.g., Nomex®) and/or para-aramid (e.g., Kevlar®) spunlace and/or the second insulation layer 124 may be a fleece material produced from a blend of meta-aramid (e.g., Nomex®), para-aramid (e.g., Kevlar®), and/or anti-static fibers. In some instances, the flame resistant fibers may also be characterized as non-water absorbing fibers. Non-water absorbing fiber does not refer to the moisture regain of the fiber. Moisture regain, as used herein, refers to percentage of atmospheric moisture in a textile material brought into equilibrium with a standard atmosphere after partial drying, calculated as a percentage of the moisture-free weight. Instead, non-water absorbing fiber refers to the fibers ability, when placed in contact with liquid water, to swell, absorb, and retain that water. It is understood that the facecloth layer 120 and/or the insulation layers 122, 124, collectively the thermal liner 110, may have any suitable thickness as desired.

In some embodiments, the moisture barrier 112 may be constructed of a non-woven or woven flame resistant fabric 130 comprising flame resistant fibers made of, for example, aramid (meta- and/or para-aramid), polybenzimidazole, polybenzoxazole, melamine, or the like, and blends thereof. The moisture barrier typically includes a semipermeable membrane layer which is moisture vapor permeable but impermeable to liquid moisture, such as CrossTech® or Stedair® 4000. The membrane layer is bonded to a substrate of flame- and heat-resistant material, such as an aramid or PBI® material. The moisture barrier 112 may be laminated with a water-impermeable layer of material (not depicted) such as, for instance, a layer of polytetrafluoroethylene (PTFE), expanded polytetrafluoroethylene (ePTFE), poly-urethane (PU), urethane, and the like, or any combination thereof. When such an impermeable layer is provided, it usually is provided on the moisture barrier 112, so as to face the thermal liner 110. It is understood that the moisture barrier 112 may have any suitable thickness as desired.

The outer shell 114 is typically constructed of a heat and flame resistant material 140 that comprises flame resistant fibers made of, for example, at least one of aramid (meta- and/or para-aramid), polybenzamidazole, polybenzoxazole, oxidized polyacrylonitrile (OPAN), or the like, and blends thereof. The outer shell 114 may be treated with a water-resistant finish to prevent or reduce water absorption from the outside environment. In that the outer shell 114 forms an exterior surface of the protective garment 10, the outer shell 114 preferably is constructed so as to be flame resistant to protect the wearer against being burned in certain applications. In addition, the outer shell 114 preferably is strong so as to be resistant to tearing and abrasion during use in extreme environments.

In certain embodiments, the material 100 may be incorporated in the protective garments 10, 12 as at least a portion of the thermal liner 110 (e.g., the facecloth layer 120 and/or the insulation layers 122, 124), a substrate of the moisture barrier 112, and/or the outer shell 114. When the material 100 may be integrated into at least one of the thermal liner 110, the moisture barrier 112, and the outer shell 114, the protective garments 10, 12 may be characterized as having a thermal protective performance (TPP per NFPA 1971) of at least 35 and a relatively low Ret of about 20 m2 Pa/W or less.

Figure 5:
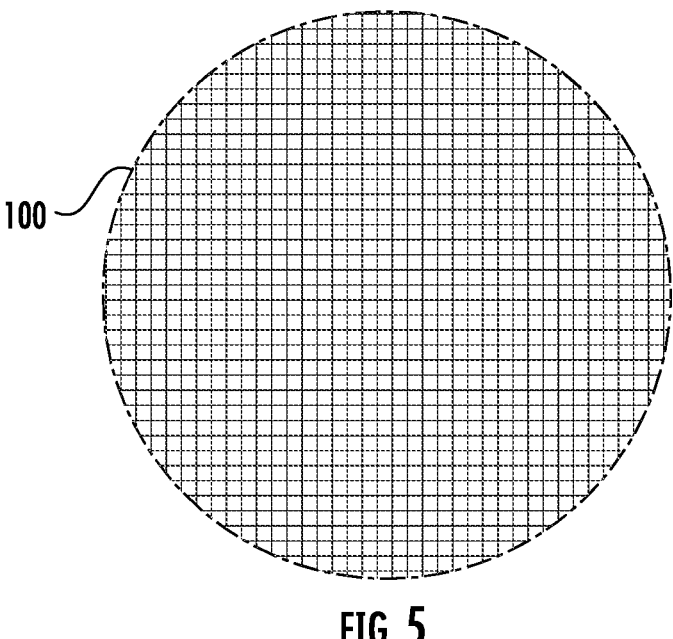
FIG. 5 is a fragmentary enlarged view of a portion of the protective garment of FIG. 3, showing the flame resistant material comprising at least an oxidized polyacrylonitrile fiber (OPF)

As best seen in FIG. 5, the material 100 may comprise flame resistant fibers, or a blend thereof, of at least one of aramid fibers (e.g, meta-aramid fibers 204 and/or para-aramid fibers 206), oxidized polyacrylonitrile fibers (OPF) 202, and/or the like. Preferably, the material 100 may comprise about 5% to about 30% of the OPF 202.

In one embodiment, at least a portion of the outer shell 114 may be produced the material 100 comprising at least the OPF 202. As a non-limiting example, the outer shell 114 may be produced from a 6.5 oz. per square yard of the material 100, shown in FIG. 5, comprising a blend of about 60% para-aramid fibers 206 (e.g., Kevlar®), about 22% meta-aramid fibers 204 (e.g., Nomex®), and about 18% OPF 202. The protective garments 10, 12 having such outer shell 114 combined with a CrossTech® or StedAir® 4000 moisture barrier 112, and a thermal liner 110 made of a Nomex® facecloth quilted to a single layer of 2.3 oz. aramid spunlace (Core CXP) has the following performance: Ret of no more than 20, THL in a range of about 205 to about 425, and TPP greater than 35. For example, the Ret may be in a range of about 15 to about 19, the THL may be greater than 260, and/or the TPP may be in a range of about 35 to about 45. This superior performance combination is due to the material 100 including the OPF 202, which has a high surface area; therefore, optimizing heat transfer in both dry and wet conditions.

Figure 6:
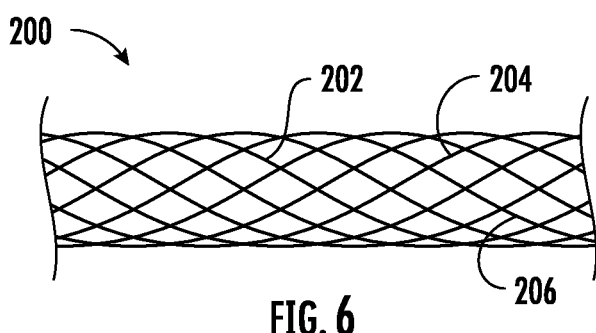
FIG. 6 is a fragmentary enlarged view of a portion of a piece of yarn comprising at least an oxidized polyacrylonitrile fiber (OPF)
Figure 7:
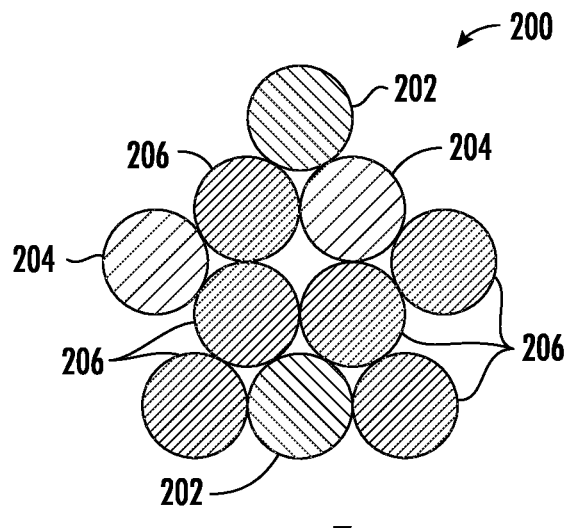
FIG. 7 is a cross-sectional view of the piece of yarn comprising at least an oxidized polyacrylonitrile fiber (OPF) shown in FIG. 6.

In some embodiments, the material 100 be made with at least one piece yarn 200, shown in FIGS. 6 and 7. For example, the yarn 200 may comprise the oxidized polyacry-lonitrile fibers (OPF) 202 intimately blended with other flame resistant fibers such as the meta-aramid fibers 204 and the para-aramid fibers 206, respectively. It is understood that the yarn 200 may be produced by an suitable method or spinning technique such as ring spinning, air jet spinning, worsted spinning, vortex spinning, stretch broken spinning, and the like, for example. The material 100 may also be made with the yarn 200 including at least one stretch broken fiber. It is understood that the at least one stretch broken fiber may be a variable length fiber that is longer than a traditional 2 inch staple yarn. In certain embodiments, the at least one stretch broken fiber may generally have a length in a range of about 3 inches to about 8 inches. It is understood, however, that the stretch broken fiber may be longer lengths as well. The yarn 200 including the at least one stretch broken OPF 202 may be mechanically stronger than 2 inch staple OPF 202, which is a desirable durability characteristic for firefighting turnout gear.

In certain embodiments, the material 100 may be produced from a blend of at least one of stretch broken para-aramid fibers 206, stretch broken meta-aramid fibers 204, stretch broken OPF 202, stretch broken viscose, stretch broken liquid crystal polymer, and other stretch broken flame resistant fibers. As a non-limiting example, the yarn 200 may be a blend of the stretch broken OPF 202 and one or more of the aforementioned stretch broken flame resistant fibers. As another non-limiting example, the yarn 200 may also include non-flame resistant fibers added thereto. A small percentage, up to about 20% of the yarn 200 may be non-flame resistant fibers such as nylon, viscose, polyester, and the like, for example.

In some embodiments, the material 100 may use stretch broken yarns or ring, vortex, air, and/or worsted yarns, alone or in combination, with the OPF 202 containing yarn 200 in the warp direction only, fill direction only, or warp and fill direction combined. The material 100 may also be rein-forced by a high strength grid and/or matrix containing filament para-aramid (Technora® a trademark of Teijin Aramid, Twaron® a trademark of Teijin Aramid, Kevlar®), liquid crystal polymer (e.g., Vectran™ manufactured by Kuraray), and/or ultra-high molecular weight polyethylene where the filament is placed in the warp direction, fill direction, or both warp and fill direction in a repeatable pattern.

In one embodiment, the material 100 is comprised only of stretch broken fibers including stretch broken OPF 202 and stretch broken aramids (e.g., meta-aramid fibers 204 and para-aramid fibers 206). As a non-limiting example, the material 100 is comprised entirely of yarn 200 including about 18%-22% stretch broken OPF 202, about 22% stretch broken meta-aramid fibers 204 and about 60% stretch broken para-aramid fibers 206. In another embodiment, the material 100 is comprised of about 80%-90% of the stretch broken OPF 202 intimately blended with other flame resistant fibers (e.g., the meta-aramid fibers 204 and the para-aramid fibers 206) and about 10%-20% of other flame resistant and/or non-flame resistant fibers. In yet another embodiment, the material 100 is comprised of about 80%-90% of the yarn 200 produced from the stretch broken OPF 202 intimately blended with other flame resistant fibers (e.g., the meta-aramid fibers 204 and the para-aramid fibers 206) and about 10%-20% of stretch broken aramid fibers and/or aramid spun yarn. As a non-limiting example, the material 100 is comprised of the yarn 200 produced from the stretch broken OPF 202 intimately blended with the meta-aramid fibers 204 and the para-aramid fibers 206 as every $1^{st}$-$7^{th}$ yarn, and a yarn produced from stretch broken aramid fibers (e.g., the meta-aramid fibers 204 and the para-aramid fibers 206) without OPF 202 as every $8^{th}$ yarn.

In other embodiments, the material 100 may also be incorporated into a multi-layer laminate such as a tri-laminate, for example. The multi-layer laminate may be an outer layer of a particulate blocking fabric and/or an outer layer of the outer shell 114. In on preferred embodiment, the multi-layer laminate may comprise an outer first layer (e.g. the material 100 containing the OPF 202), a membrane second layer (e.g., a particulate-blocking film), and/or an inner third layer (e.g., a lightweight knit or woven scrim). As a non-limiting example, the multi-layer laminate comprises the outer layer produced from about 3 oz. of the material 100 containing the OPF 202, the membrane produced from about 1 oz. of the particulate-blocking film, and the inner layer produced from about 0.5 oz. to about 3 oz. of the lightweight knit or woven scrim. Accordingly, the multi-layer laminate may be about 5.0 oz. to about 7.5 oz.

In some embodiments, the material 100 comprising at least the OPF 202 may also be used as the substrate for lamination to ePTFE film in the moisture barrier 112. The material 100 for the substrate of the moisture barrier 112 may be about 2 oz. to about 5 oz. per square yard and contains OPF 202 (staple length and/or stretch broken) intimately blended with flame resistant fibers such as meta-aramid (e.g. Nomex®) and/or non-flame resistant fibers. The material 100 used for the substrate of the moisture barrier 112 may be a woven or knit. The material 100 may be laminated to the ePTFE film to create the moisture barrier 112. Such substrate using the material 100 has optimized heat and moisture vapor transfer properties vs conventional substrates currently used such as meta-aramid substrates, polybenzimidazole and/or polybenzoxazole containing substrates, and aramid spunlace substrates. The substrate using the material 100 may also be used as the outer layer of the tri-laminate discussed hereinabove. The tri-laminate may have an inner layer of film with particulate blocking capabilities, and the inner layer would be a lightweight flame resistant scrim optimized for comfort.

In some embodiments, the material 100 comprising at least the OPF 202 may also be incorporated into the facecloth layer 120 of the thermal liner 110. The material 100 may be used in the facecloth layer 120 to provide excellent comfort as measured by the THL and/or Ret test. As described above, the facecloth layer 120 of the thermal liner 110 may be an innermost layer of the protective garments 10, 12. It is important that the facecloth layer 120 efficiently moves moisture and moisture vapor from the wearer's skin to remove heat produced by the body during rigorous firefighter activities and cool core body temperature. In other embodiments, the material 100 comprising at least the OPF 202 may also be incorporated into one or more non-woven portions of the thermal liner 110.

As a non-limiting example, the facecloth layer 120 of the thermal liner 110 may be, either woven or knit, between about 2 oz. and about 5 oz. per square yard, containing 2" staple or stretch broken OPF 202 in the warp direction, filling direction, or both warp and filling direction intimately blended with other flame resistant fibers such as meta-aramid, flame resistant viscose, para-aramid and/or non-flame resistant fibers. The facecloth layer 120 of the thermal liner 110 may also contain one direction of meta-aramid or para-aramid, and/or flame resistant viscose filament yarns to provide soft/slick performance and one direction containing a blend of OPF 202 and flame resistant fiber such as meta-aramid, and/or para-aramid, and/or modacrylic, and/or flame resistant viscose and/or a non-flame resistant fiber to provide optimized heat transfer and protection.

Optimization of the performance benefits of the material 100 comprising at least the OPF 202 for the protective garments 10, 12, mainly thermal protection and comfort (regulating core body temperature), are achieved by a system approach. The system approach, may include incorporating the material 100 comprising at least the OPF 202 into at least one of the layers of the protective garments 10, 12 (e.g., the thermal liner 110, the moisture barrier 112, and/or the outer shell 114) in an optimal amount. In one embodiment, the thermal liner 110, the moisture barrier 112, and/or the outer shell 114, or a combination thereof, may use the material 100 comprising about 10-30% OPF 202. In another embodiment, the thermal liner 110, the moisture barrier 112, and/or the outer shell 114, or a combination thereof, may use the material 100 comprising about 5-30%. OPF 202. In yet another embodiment, the material 100 comprising at least the OPF 202 may be incorporated into non-woven portions of the protective garments 10, 12. It is understood that the OPF 202 may be used alone or in combination with other fibers such as one or more aramid fibers (e.g., meta-aramid, para-aramid). The non-woven portions of the protective garments 10, 12 may be in the form of a spunlace or needlepunch. The protective garments 10, 12 utilizing such materials 100 may efficiently move heat from one layer to the next, away from the wearer to lower core body temperature. In the event that moisture is present such as sweat, multi-layer protective garments 10, 12 using the material 100 may optimally move heat and moisture vapor by lowering evaporative resistance between each of the thermal liner 110, the moisture barrier 112, and/or the outer shell 114, and overall from the wearer to the outside environment. The protective garments 10, 12 using the material 100 may also provide optimal protection. Each of the thermal liner 110, the moisture barrier 112, and/or the outer shell 114, or a combination thereof, may work synergistically to block heat (radiant and/or direct flame source) from the wearer due to the thermally protective characteristics of the OPF 202.

The material 100 comprising at least OPF 202 when used in a fire service industry, either in a NFPA 1971 or NFPA 1951 compliant protective garments 10, 12, offer exceptional comfort and protection characteristics to ensure that wearers can safely perform their duties in structural fire, overhaul, urban search and rescue, and other various missions. The material 100 comprising at least OPF 202 used in turnout gear, and more particularly the outer shell 114, and compliant with NFPA 1971, provide the best combination of protection as tested by the TPP test and comfort as tested by the THL and/or Ret test.

As identified above, the resistance to evaporative heat transfer of at least one of the thermal liner 110, the moisture barrier 112, and/or the outer shell 114 may be lessened by using the material 100. Therefore, the protective garments 10, 12 may be significantly improved without sacrificing pliability, processibility, and the like. By using the material 100, it is possible to produce protective garments 10, 12 that optimize evaporative heat transfer to reduce heat stress of the wearer, while maximizing thermal protection.

Advantageously, the protective garments 10, 12 are desirably compliant with any associated NFPA standards, including but not limited to NFPA 1971 Standard 2007 edition, and with EN 469 Standard 2005 edition. By incorporating the material 100, the protective garments 10, 12 of the present disclosure balance the features of effectively preventing absorption of moisture from the wearer, as well as forcing wet, dangerously hot air out away from the wearer, while maintaining desired insulative properties found in a dry condition, even when challenged by hazardous thermal exposures.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A material comprising:
about 80 number % to about 90 number % of stretch-broken oxidized polyacrylonitrile fibers blended with flame resistant fibers; and
about 10 number % to about 20 number % of stretch-broken aramid fibers.

2. A protective garment, comprising: an outer shell; and a thermal liner disposed adjacent the outer shell, wherein at least a portion of the protective garment is formed from the material of claim 1, wherein the protective garment has a Resistance to Evaporative Heat Transfer (Ret) of no more than 20 m² Pa/W, a Total Heat Loss (THL) in a range of about 205 to about 425 W/m², and a Thermal Protective Performance (TPP) of greater than 35.

3. The protective garment of claim 2, wherein at least a portion of the outer shell is formed from the material comprising the at least one first fiber produced from an oxidized polyacrylonitrile.

4. The protective garment of claim 2, wherein at least a portion of the thermal liner is formed from the material comprising the at least one first fiber produced from an oxidized polyacrylonitrile.

5. The protective garment of claim 2, wherein the thermal liner includes at least one of a facecloth layer and an insulation layer, and wherein at least a portion of the at least one of the facecloth layer and the insulation layer is formed from the material comprising the at least one first fiber produced from an oxidized polyacrylonitrile.

6. The protective garment of claim 2, further comprising a moisture barrier disposed between the outer shell and the thermal liner.

7. The protective garment of claim 6, wherein at least a portion of the moisture barrier is formed from the material comprising the at least one first fiber produced from an oxidized polyacrylonitrile.

8. The protective garment of claim 6, wherein the moisture barrier comprises a substrate and a membrane disposed on the substrate.

9. The protective garment of claim 8, wherein at least a portion of the substrate of the moisture barrier is formed from the material comprising the at least one first fiber produced from an oxidized polyacrylonitrile.

10. The protective garment of claim 8, wherein the membrane is produced from at least one of a polytetrafluoroethylene (PTFE), an expanded polytetrafluoroethylene (ePTFE), a polyurethane (PU), and a urethane.

11. A laminate, comprising:
a first layer, wherein at least a portion of the first layer is formed from a material comprising about 80 number % to about 90 number % of stretch broken oxidized polyacrylonitrile fibers blended with flame resistant fibers and about 10 number % to about 20 number % of stretch broken aramid fibers; and
a second layer disposed adjacent the first layer, wherein the laminate forms at least a portion of a particulate blocking material.

12. The laminate of claim 11, wherein the second layer is a particulate blocking film.

13. The laminate of claim 11, further comprising a third layer disposed adjacent the second layer.

14. The laminate of claim 13, wherein the third layer is at least one of a knit, a woven, and a stretch woven.

15. The material of claim 1, wherein the flame resistant fibers include meta-aramid fibers and para-aramid fibers.

16. The material of claim 1, wherein the stretch broken aramid fibers include stretch broken meta-aramid fibers and/or stretch broken para-aramid fibers.

17. The material of claim 1, further comprising a reinforcement grid and/or matrix including filament produced from para-aramid, liquid crystal polymer, and/or ultra-high molecular weight polyethylene.

\* \* \* \* \*